United States Patent [19]

Bitetti

[11] Patent Number: 4,801,926
[45] Date of Patent: Jan. 31, 1989

[54] DEVICE FOR SENSING THE LEVEL OF A LIQUID WITHIN THE INTERIOR OF A CONTAINER

[75] Inventor: Rodolfo Bitetti, Milan, Italy

[73] Assignee: Veglia Borletti S.r.L., Turin, Italy

[21] Appl. No.: 188,731

[22] Filed: Apr. 29, 1988

Related U.S. Application Data

[63] Continuation of Ser. No. 924,353, Oct. 29, 1986, abandoned.

[30] Foreign Application Priority Data

Oct. 29, 1985 [IT] Italy ............................... 53980/85[U]

[51] Int. Cl.⁴ ............................................. G08B 21/00
[52] U.S. Cl. .................................... 340/624; 73/307; 73/319; 200/84 C
[58] Field of Search ................ 116/228, 110; 307/118; 340/624, 623; 73/305, 307, 308, 309, 314, 319, 320, 322.5; 200/61.2, 84 R, 84 C, 84 A; 24/456, 565, 467

[56] References Cited

U.S. PATENT DOCUMENTS

| | | | |
|---|---|---|---|
| 3,857,004 | 12/1974 | Kavthekar | 340/624 |
| 4,020,481 | 4/1977 | Nakagawa | 340/624 |
| 4,258,238 | 3/1981 | Dombrowski et al. | 340/625 |
| 4,694,128 | 9/1987 | Lupoli et al. | 200/84 R |

FOREIGN PATENT DOCUMENTS 0955031 4/1964 United Kingdom.
1330493 9/1973 United Kingdom.
1575793 10/1980 United Kingdom.

Primary Examiner—Joseph A. Orsino
Assistant Examiner—Jill D. Jackson
Attorney, Agent, or Firm—Michael E. Meller

[57] ABSTRACT

The device is of the type comprising a magnet carried by a float and a magnetically actuable electric contact carried by a support element which also performs the function of guarding the float. The most important characteristic of the device is that of providing positioning means which maintain the float constantly centered with respect to the support element during excursions of this latter caused by the hydrostatic thrust exerted by the liquid.

21 Claims, 1 Drawing Sheet

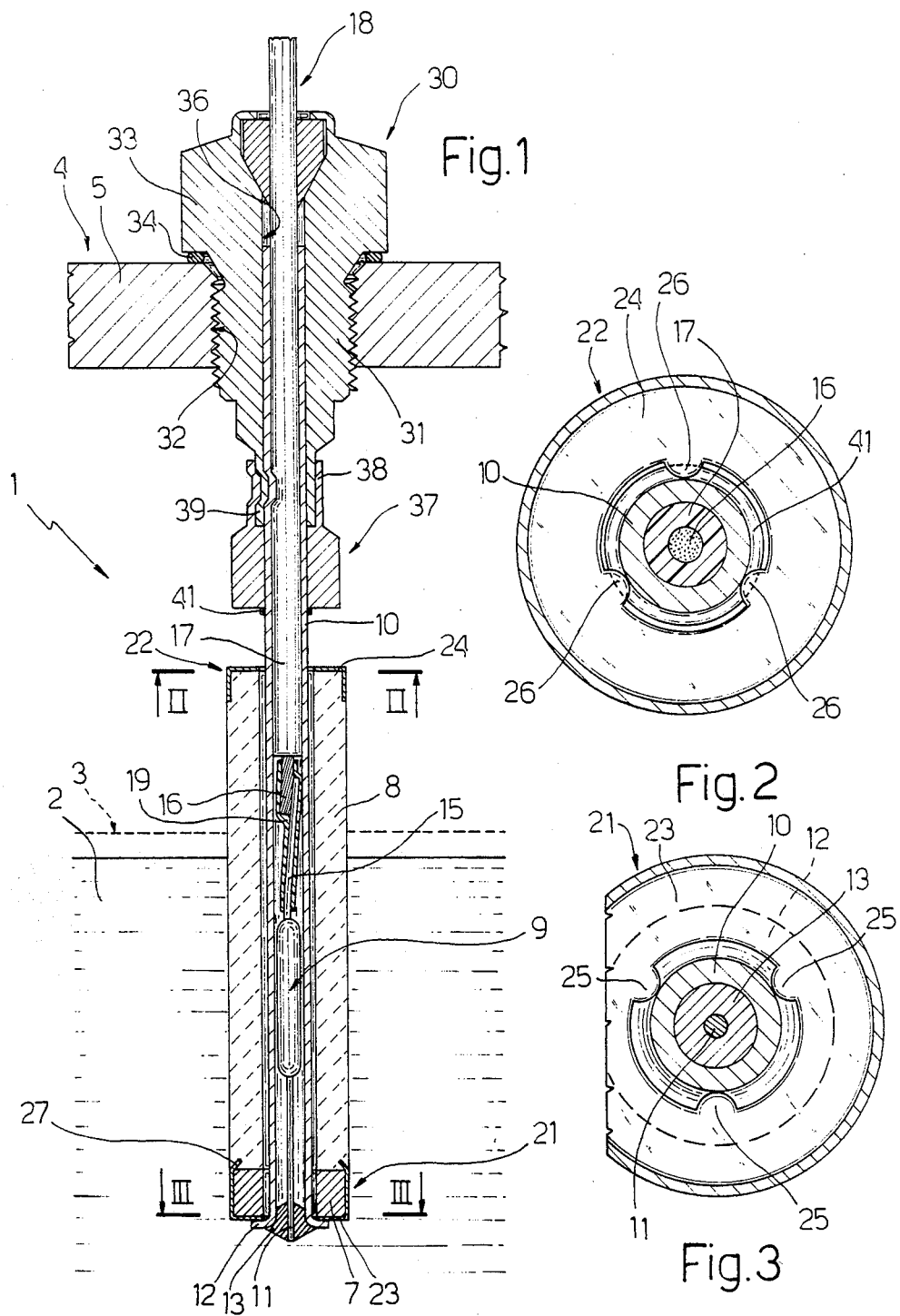

DEVICE FOR SENSING THE LEVEL OF A LIQUID WITHIN THE INTERIOR OF A CONTAINER

This application is a continuation of application Ser. No. 924,353, filed Oct. 29, 1986, now abandoned.

BACKGROUND OF THE INVENTION

The present invention relates to a device for sensing the level of a liquid within a container. More particularly, the present invention relates to a device able to detect the presence of lubricating oil of an engine within the interior of an associated reservoir such as, for example, the oil collection sump thereof.

Numerous level sensing devices are known in commerce, which provide an indication of electrical type when the level of the liquid under test falls below a minimum predetermined value. There are, for example, known sensors which utilize a pair of bimetal elements mounted at the end of a rod which is held immersed in the container; on one of these elements there is wound a resistor which is periodically supplied with electric current in such a way as to generate a localized heating of one of the two bimetal elements. Depending on whether or not these elements are immersed in the liquid, there will occur a dispersion of the heat developed in the mass of liquid or else a concentration of the heat on the bimetallic element. In the first case the bimetal element does not show any practical effects of the variation of heat and therefore does not deform, whereas in the second case the localized variation of temperature causes a deformation of the bimetal element and consequent opening of the electrical contact, is established by this latter. The disadvantages presented by devices of the above specified type are principally connected with the criticality of intervention and the cost of the devices themselves, which require for their operation a suitable electronic circuit to supply them.

There are likewise known sensor devices which essentially comprise a magnet supported by a tubular float, and a magnetically actuable electric contact element supported by a suitable element, which also performs the function of constituting the guide for displacements of the float under the action exerted by the hydrostatic thrust of the liquid. It is observed, however, that such devices are hardly used in the detection of the level of oil because the viscosity of this liquid creates a high surface tension between the float and the associated support element, making excursions of the first with respect to the second difficult and therefore involving a low precision or indication of the predetermined level.

SUMMARY OF THE INVENTION

The object of the present invention is that of providing a level sensor device for a liquid within a container, which allows the disadvantages presented by sensors of known type and specified above to be overcome.

This object is achieved with the present invention in that it relates to a sensor device for detecting the presence of a liquid at a predetermined level within the interior of a reservoir and of the type comprising at least one magnet supported by a tubular float, and a magnetically actuable electric contact element fixed to a suitable support element, this latter being introduceable into the said container to constitute a guide for displacements which the hydrostatic thrust exerted by the liquid induce in the float; the sensor device is characterized in that it includes centering means defining an essentially constant relative positioning of the float with respect to the guide and support element over the section traversed by the float under the action exerted by the hydrostatic thrust.

BRIEF DESCRIPTION OF THE DRAWINGS

For a better understanding of the present invention there is now described a preferred embodiment purely by way of non-limitative example, with reference to the attached drawings, in which:

FIG. 1 is a view in elevation and partially in section of a sensor device formed according to the principles of the present invention and illustrated in one example of application; and FIGS. 2 and 3 are sections, along an enlarged scale, taken on the lines II—II and III—III of FIG. 1.

DETAILED DESCRIPTION OF THE INVENTION

With particular reference to FIG. 1, there is generally indicated with reference numeral 1, a sensor device for detecting the presence of a liquid 2 at a predetermined level 3 within a container 4 of which there is indicated a wall 5 which could be an upper wall or else a bottom wall of the container itself.

The device 1 essentially comprises a magnet 7, a tubular float 8 supporting the magnet 7, a magnetically actuable electrical contact element 9 and a support element 10 essentially constituted by a small tube within which is fixed the electrical contact element 9. In more detail, the contact element 9 has a first terminal 11 which partially projects, in an axial direction, from the support tube 10, the latter being conveniently formed of a metallic and non-magnetic material. The terminal 11 is fixed to an end portion 12, conveniently folded outwardly, of the tube 10 by means of a suitable soldering indicated 13. The electrical contact element 9 has a second terminal 15 which is soldered to a bare end portion of a conductor 16 which is normally covered with a protective sheath 17 and which defines with the sheath a cable 18 able to convey to the exterior an electrical indication relating to the opening and closure of the electrical contact element 9 in dependence on the position assumed by the magnet 7 under the hydrostatic thrust exerted by the liquid 2. The terminal 15 and the conductor 16 are covered in correspondence with their contact zones by means of an insulating covering 19 conveniently made with a material of heat resisting type to avoid any unwanted electrical contact between the terminal 15 or conductor 16 and the tube 10.

According to the present invention, the device 1 includes a pair of end caps 21, 22 which are fixed in correspondence with the opposite ends of the float 8 and have the purpose of centering and correctly spacing the float 8 from the tube 10 to avoid the possibility that surface tension exerted by the liquid 2 may cause the inner surface of the float 8 to adhere to the facing outer surface of the tube 10. For this purpose each end cap 21, 22 has, in correspondence with its annular base wall 23,24 radial tongues 25,26 (FIGS. 2 and 3), extending inwardly and cooperable with the facing surface of the tube 10 to maintain the float 8 spaced from the tube 10 itself. In particular the end cap 21 also serves the purpose of fixing the magnet 7 to the float 8 and has in particular an end portion 27 which is folded in towards the body of the float 8 in such a way as to constitute an attachment element. Conveniently, the end cap 21 is co-molded with the float 8. The end cap 22 can also be co-molded with the float 8, but preferably is simply secured by adhesive to the float not in fact having to support the magnet 7.

The device 1 further includes a body 30 having a threaded portion 31 which can be screwed into a corresponding threaded hole 32 in the wall 5 of the container 4. The body 30 further has a portion 33 of enlarged section which has, for example, hexagonal section which can be engaged by a corresponding key to allow screwing of the body 30; this portion 33 cooperates frontally with the outer surface of the wall 5 of the container 4 by means of an annular seal 34 to prevent the escape of liquid 2 from the hole 32. The body 30 has an axial through hole 36 passing therethrough, the diameter of which is essentially identical to the outer diameter of the tube 10. In effect tube 10 is slidably mounted within the hole 36 and there is, moreover, provided a bush 37 which serves to connect the body 30 and the tube 10 together. In particular, the bush 37 has a portion 38 of reduced section, which surrounds a terminal projection 39 of the body 30 and the tube 10. The fixing of the tube 10 to the projection 39 is obtained by squeezing the portion 38 of the bush 37 in such a way as to create a radial deformation both in the projection 39 a corresponding zone of the tube 10. The bush 37 further has, in the part facing the float 8, a ring 41 (formed integrally or soldered to the bush itself) the diameter of which is such that the contact between the ring 41 itself and the end cap 22 takes place only in correspondence with the tongues 26 of end cap 22, which, as is clearly visible in FIG. 2, are equi-distant and circumferentially distributed at 120°. In this way it is likewise avoided that the surface tension force causes an improper adhesion of the facing surfaces of the end cap 22 and the bush 37 and thus an unwanted retention of the float 8 to the bush 37 even when the level of liquid 2 falls below the level 3.

In use, the connection between the tube 10 and the body 30 occurs during a calibration operation. In substance, the tube 10 is displaced by making it slide within the hole 36 until it reaches a predetermined intervention height of the electrical contact element 9, conveniently detectable by means of a suitable tool. The calibration operation described above could also be effected with the float 8 immersed in the liquid 2, in which case it would also be necessary to take into account the constructional tolerances and positioning both of the float 8 and of the contact element 9. Once the correct position of the tube 10 with respect to the body 30 has been identified, and this could coincide with the actuation of the electrical contact 9, it is sufficient to perform the squeezing of the portion 38 of the bush 37 for the purpose of deforming radially both the projection 39 of the body 30 and the tube 10, thus fixing these with respect to one another.

The operation of the device 1 is essentially as known. In fact, once the device 1 has been introduced into the hole 32 in the container 4, the float 8 will act to carry the magnet 7 fixed to it in such a way as to allow actuation of an alarm signal (opening of the contacts of the element 9) when the level of the oil 2 falls below the predetermined level 3.

The electric signal generated by the device 1 is essentially a ground signal in that the terminal 15, fixed to the conductor 16, can be electrically connected to the terminal 11 through the contacts of the element 9; this terminal 11 then leads to ground generally via the soldering 25, the tube 10, the body 30 and the wall 5 of the container 4.

From a study of the characteristics of the device formed according to the present invention, the advantages which it allows to be obtained are evident. First of all the end caps 21 and 22 ensure a correct and constant spacing of the float 8 from the corresponding support tube 10 and therefore prevent the surface tension from making these latter adhere to one another and thereby influencing the relative travel of the float with respect to the tube 10. Further, the tongues 25 and 26 ensure that in the opposite working positions in which the float 8 rests on the outwardly facing end portion 12 of the tube 10 in correspondence with the soldering 13, or else against the surface of the ring 41 carried by the bush 37, there is no unwanted adhesion of the float 8 to the end portion 12 or to the ring 41, again which may otherwise arise because of surface tension, thus avoiding an incorrect positioning of the float itself.

Finally, it is observed that the possibility of adjusting within a wide range the relative position between the tube 10 and the body 30 makes it possible to utilize a single device for indicating the presence of the level of a liquid at different levels of the same container, or else of different containers, with obvious advantages from the point of view of the possible applications of the device itself.

Finally, it is clear that the device 1 described above can be modified and varied without departing from the scope of the present invention. For example, the tube 10 could be conveniently replaced by a bar of plastics material with the electrical contact element 9 co-molded within the interior. In this case the terminal 11 of the element 9 could be folded upwardly in such a way as to be connected with a further conductor of an electrical cable which, in the specific case would be bi-polar. The advantage of this solution would essentially lie in the fact that freedom would be gained from having to form a good electrical contact to ground at the terminal 11, an electrical contact which could be problematical to form if the container 4 were made of plastics material.

Numerous other variants of the adopted system of positioning the float 8 and the tube 10 could also be envisaged. For example, there could be provided indentations or axial ribs extending radially from the body of the tube 10, or else again there could conveniently be utilized an annular magnet having, on the part facing inwardly, radial guide indentations which would serve, in this case, the same function as the tongues 25.

I claim:

1. A sensor device for detecting the presence of a liquid at a predetermined level within a container and of the type comprising at least one magnet supported by a tubular float, and a magnetically actuable electrical contact element fixed to a guide and support element, said guide and support element being introduceable into said container to constitute a guide for the displacement which the hydrostatic thrust exerted by said liquid induces in said float and comprising a first portion within which said electrical contact element is lodged, and a second portion which can be fixed to a wall of said container to receive said first portion, wherein said sensor device further comprises centering means defining an essentially constant relative positioning of said float with respect to said support and guide element along the length thereof traversed by said float under the action exerted by said hydrostatic thrust, and locking means capable of fixing said first portion to said second portion of said guide and support element, said locking means comprising a bush surrounding said first and second portions, said bush having a portion of reduced diameter surrounding an end projection of said second portion, said bush portion being plastically deformable in a radial direction together with said end projection and said first portion in such a way as to establish a mechanical connection between them.

2. A device according to claim 1, wherein said first portion comprises plastics material within which said electrical contact element is jointly molded.

3. A device according to claim 1, wherein said second portion has an axial through hole for receiving said first portion.

4. A device according to claim 1, wherein said first portion comprises a tube.

5. A device according to claim 4, wherein said tube is made of non-magnetic conductive material.

6. A device according to claim 5, wherein said electrical contact element has a first terminal electrically connected to said conductive tube and a second terminal electrically connected to a conductor forming part of an electrical cable lodged within said tube.

7. A device according to claim 1, further comprising stop means for stopping linear displacement of said float at two opposite working positions.

8. A device according to claim 7, wherein said stop means on one side comprise a stopping element the position of which is fixed with respect to said guide and support.

9. A device according to claim 8, wherein said stopping element has a reduced transverse section and is operable to intercept a corresponding reduced portion of said facing surface of said float.

10. A device according to claim 1, wherein said centering means are carried by said float.

11. A device according to claim 10, wherein said centering means comprise elements extending radially towards the interior of said float.

12. A device according to claim 11, wherein said elements extend from said magnet.

13. A device according to claim 11, wherein said elements extend directly from said float.

14. A device according to claim 11, wherein said elements extend from end caps fixed at opposite ends of said float.

15. A device according to claim 14, wherein at least one of said end caps is secured by adhesive to said float.

16. A device according to claim 14, wherein at least one of said end caps is molded jointly with said float.

17. A device according to claim 16, wherein said magnet is positioned in correspondence with one end of said float and is anchored to said float by means of said end cap jointly molded with said float.

18. A device according to claim 14, wherein said elements extending from said end caps comprise a plurality of radial tongues.

19. A device according to claim 18, further comprising a ring which is fixed with respect to said guide and support element and which is cooperable with said radial tongues on one of said end caps for stopping displacement of said float in one direction.

20. A device according to claim 18, wherein said radial tongues are uniformly distributed about a circumference.

21. A device according to claim 20, wherein said radial tongues are angularly separated by 120°.

* * * * *